United States Patent
Dalsgaard et al.

(10) Patent No.: US 9,107,227 B2
(45) Date of Patent: Aug. 11, 2015

(54) ACTIVATION AND DEACTIVATION OF COMPONENT CARRIER MEASUREMENTS BASED ON THRESH-OLD SETTINGS

(75) Inventors: Lars Dalsgaard, Oulu (FI); Jarkko Koskela, Oulu (FI); Jorma Kaikkonen, Oulu (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 134 days.

(21) Appl. No.: 13/577,759

(22) PCT Filed: Feb. 16, 2011

(86) PCT No.: PCT/FI2011/050146
§ 371 (c)(1),
(2), (4) Date: Aug. 8, 2012

(87) PCT Pub. No.: WO2011/101543
PCT Pub. Date: Aug. 25, 2011

(65) Prior Publication Data
US 2012/0300667 A1      Nov. 29, 2012

Related U.S. Application Data

(60) Provisional application No. 61/304,996, filed on Feb. 16, 2010.

(51) Int. Cl.
*H04W 24/00* (2009.01)
*H04W 72/08* (2009.01)
(Continued)

(52) U.S. Cl.
CPC ............ *H04W 72/085* (2013.01); *H04L 5/001* (2013.01); *H04L 5/003* (2013.01); *H04L 5/006* (2013.01); *H04L 5/0073* (2013.01); *H04L 5/0098* (2013.01); *H04W 72/042* (2013.01)

(58) Field of Classification Search
CPC . H04W 72/1231; H04W 40/00; H04W 36/16; H04W 72/08; H04W 16/10; H04W 24/08; H04W 24/10; H04W 28/048; H04W 28/06; H04W 28/08; H04W 28/18; H04W 36/0055; H04W 36/0083; H04W 36/0088; H04W 36/0094; H04W 36/06; H04W 36/18; H04W 36/30; H04W 36/36; H04W 48/16; H04W 52/343; H04W 52/40; H04W 56/00; H04W 56/0045; H04W 72/00; H04W 72/04; H04W 72/042; H04W 72/0453; H04W 72/0486; H04W 72/082; H04W 72/085; H04W 72/12; H04W 72/1221; H04W 72/1284; H04W 76/025; H04W 76/064; H04W 88/06; H04W 88/08; H04L 1/0026; H04L 1/0028; H04L 1/20; H04L 25/0204; H04L 25/022; H04L 47/10; H04L 5/00; H04L 5/0007; H04L 5/001; H04L 5/0032; H04L 5/0033; H04L 5/0037; H04L 5/0042; H04L 5/0048; H04L 5/0053; H04L 5/0055; H04L 5/006; H04L 5/0062; H04L 5/0064; H04L 5/0066; H04L 5/0073; H04L 5/008; H04L 5/0091; H04L 5/0094; H04L 5/0098
USPC .......... 714/748–749; 370/329, 328, 331, 332, 370/350, 342, 338, 336, 310, 252, 235; 455/422.1–460, 69, 67.13, 67.11, 63.1, 455/561, 560, 522, 453, 452.2, 452.1, 445, 455/444, 442, 435.2, 434, 425, 423, 226.2
See application file for complete search history.

(56) References Cited

U.S. PATENT DOCUMENTS

2009/0300456 A1   12/2009  Pelletier et al.
2010/0003979 A1    1/2010  Iwamura et al. .............. 455/436
(Continued)

FOREIGN PATENT DOCUMENTS

CN      1402456 A     3/2003
EP      1879420 A2    1/2008
(Continued)

OTHER PUBLICATIONS

U.S. Appl. No. 61/246,052, filed Sep. 25, 2009.*
(Continued)

*Primary Examiner* — Charles C Jiang
*Assistant Examiner* — Rose Clark
(74) *Attorney, Agent, or Firm* — Harrington & Smith

(57) ABSTRACT

In accordance with an exemplary embodiment of the invention there is at least a method, computer program, and apparatus for receiving over a first component carrier from a serving cell at least one of a first threshold and a second threshold, and performing at least one of: measuring the first component carrier and determining if the measurement exceeds the first threshold, and utilizing the second threshold and determining if a neighboring cell is a potential candidate for scheduling on a second component carrier.

20 Claims, 8 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 2010/0184434 | A1* | 7/2010 | Jeong et al. | 455/435.2 |
| 2010/0271939 | A1* | 10/2010 | Gholmieh et al. | 370/228 |
| 2011/0170496 | A1* | 7/2011 | Fong et al. | 370/329 |
| 2011/0212693 | A1* | 9/2011 | Sagfors et al. | 455/67.11 |
| 2011/0269449 | A1* | 11/2011 | Kazmi et al. | 455/422.1 |
| 2012/0003943 | A1* | 1/2012 | Marinier et al. | 455/73 |
| 2012/0113935 | A1* | 5/2012 | Lindoff et al. | 370/329 |
| 2012/0300667 | A1 | 11/2012 | Dalsgaard et al. | 370/252 |
| 2013/0010619 | A1* | 1/2013 | Fong et al. | 370/252 |
| 2013/0016841 | A1* | 1/2013 | Fong et al. | 380/287 |

FOREIGN PATENT DOCUMENTS

| | | | |
|---|---|---|---|
| EP | 2537385 | A1 | 12/2012 |
| WO | WO-2009/120125 | A1 | 10/2009 |
| WO | WO-2011/101543 | A1 | 8/2011 |

OTHER PUBLICATIONS

"3rd Generation Partnership Project; Technical Specification Group Radio Access Network; Evolved Universal Terrestial Radio Access (E-UTRA) Radio Resource Control (RRC); Protocol Specification (Release 9)", 3GPP TS 36.331, V9.1.0, Dec. 2009, pp. 1-233.

"3rd Generation Partnership Project; Technical Specification Group Radio Access Network; Evolved Universal Terrestrial Radio Access (E-UTRA); Requirements for Support of Radio Resource Management (Release 9)", 3GPP TS 36.133, V9.2.0, Dec. 2009, pp. 1-359.

"Carrier Aggregation Deployment Scenarios", 3GPP TSG-RAN WG2 #68bis, R2-100531, Agenda Item: 7.1.1, NTT Docomo, Inc., Jan. 18-22, 2010, pp. 1-2.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.11.0, Dec. 2009, pp. 1-148.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)", 3GPP TS 36.300, V9.1.0, Sep. 2009, pp. 1-165.

"3rd Generation Partnership Project; Technical Specification Group Radio Access Network; Requirements for Further Advancements for Evolved Universal Terrestrial Radio Access (E-UTRA) (LTE-Advanced) (Release 9)", 3GPP TR 36.913, V9.0.0, Dec. 2009, pp. 1-15.

"3rd Generation Partnership Project; Technical Specification Group Radio Access Network; Evolved Universal Terrestrial Radio Access (E-UTRA); Physical Layer—Measurements (Release 9)", 3GPP TS 36.214, V9.0.0, Dec. 2009, pp. 1-13.

"3rd Generation Partnership Project; Technical Specification Group Radio Access Network; Evolved Universal Terrestrial Radio Access (E-UTRA); User Equipment (UE) Procedures in Idle Mode (Release 8)", 3GPP TS 36.304, V8.8.0, Dec. 2009, pp. 1-30.

International Search Report and Written Opinion received for corresponding International Patent Application No. PCT/FI2011/050146, dated Jun. 3, 2011, 12 pages.

"Measurements for Carrier Aggregation", 3GPP TSG-RAN WG2 #68 bis, R2-100122, Agenda Item: 07.1.5, Ericsson, ST-Ericsson, Jan. 18-22, 2010, pp. 1-8.

"Carrier Aggregation and the s-Measure Criterion", 3GPP TSG-RAN WG2 #68 bis, R2-100196, Agenda Item: 07.1.5, Ericsson, ST-Ericsson, Jan. 18-22, 2010, pp. 1-4.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300, V10.2.0, Dec. 2010, pp. 1-200.

Huawei; "Measurement Consideration in CA"; 3GPP TSG-RAN2 #68 meeting, R2-096495; Jeju, Korea; Nov. 9-13, 2009; pp. 1-4.

\* cited by examiner

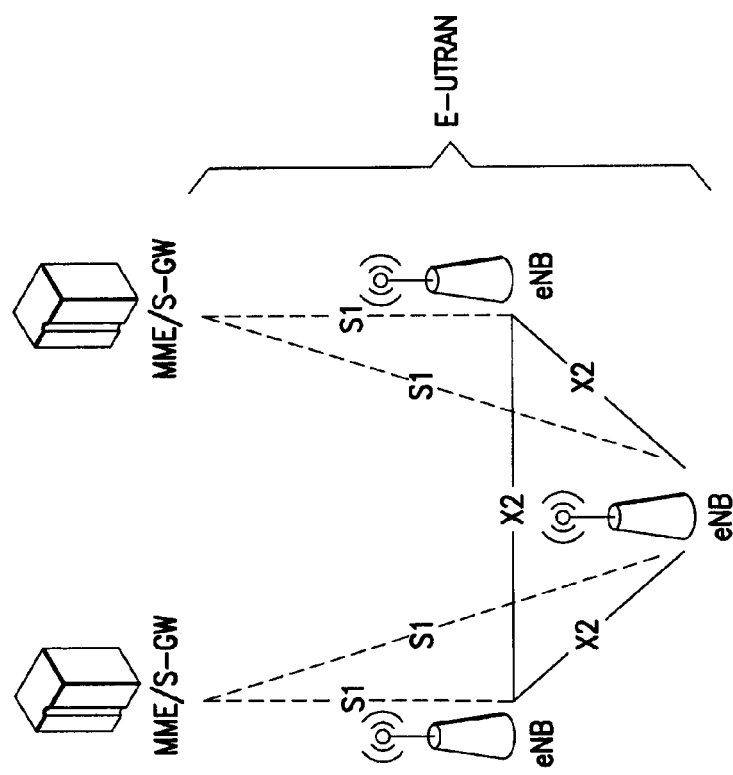
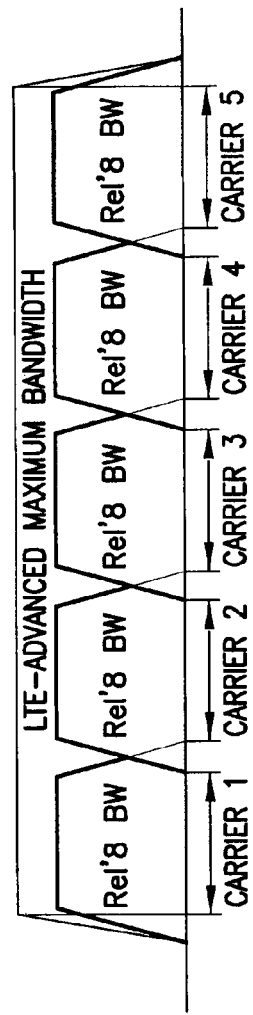
FIG. 1A
FIG. 1B

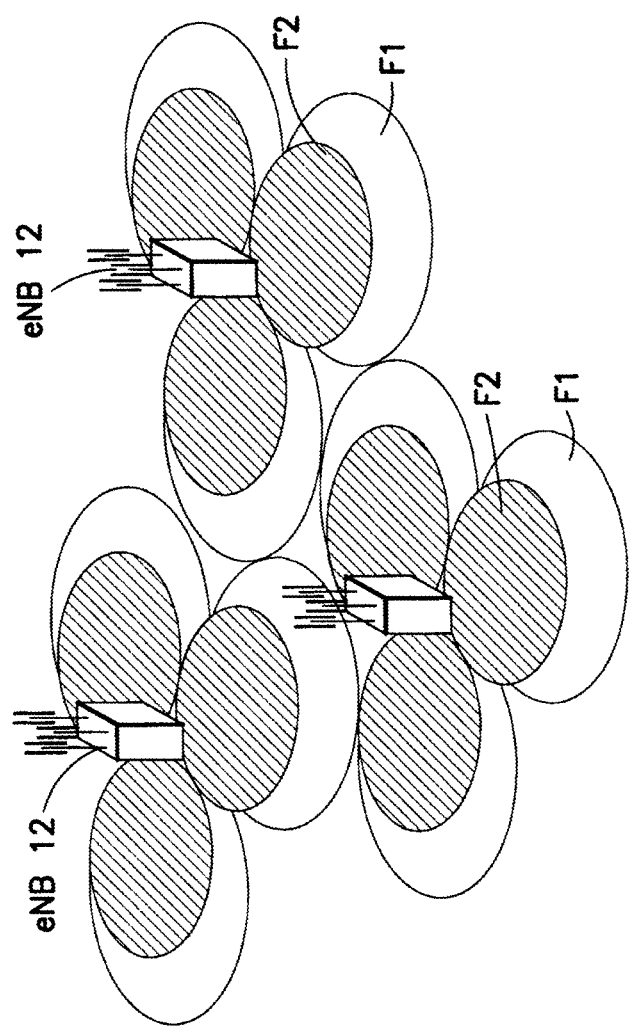

ACTIVATION AND DEACTIVATION OF COMPONENT CARRIER MEASUREMENTS BASED ON THRESH-OLD SETTINGS

RELATED APPLICATION

This application was originally filed as PCT Application No. PCT/FI2011/050146 filed Feb. 16, 2011 which claims priority benefit to U.S. Provisional Patent Application No. 61/304,996, filed Feb. 16, 2010.

TECHNICAL FIELD

The exemplary and non-limiting embodiments of this invention relate generally to wireless communication systems, methods, devices and computer programs and, more specifically, relate to wireless communications systems that use carrier aggregation of multiple component carriers, and to measurements related to carrier aggregation and mobility.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| BW | bandwidth |
| CA | carrier aggregation |
| CC | component carrier |
| CSG | closed subscriber group |
| DC | dual carrier |
| DL | downlink (eNB towards UE) |
| eNB | E-UTRAN Node B (evolved Node B) |
| EPC | evolved packet core |
| E-UTRAN | evolved UTRAN (LTE) |
| HSDPA | high speed downlink packet access |
| HSUPA | high speed uplink packet access |
| LTE | long term evolution of UTRAN (E-UTRAN) |
| LTE-A | LTE advanced |
| MAC | medium access control (layer 2, L2) |
| MM/MME | mobility management/mobility management entity |
| NodeB | base station |
| OFDMA | orthogonal frequency division multiple access |
| O&M | operations and maintenance |
| PDCP | packet data convergence protocol |
| PHY | physical (layer 1, L1) |
| Rel | release |
| RLC | radio link control |
| RRC | radio resource control |
| RRM | radio resource management |
| RSRP | reference signal received power |
| RSRQ | reference signal received quality |
| SGW | serving gateway |
| SC-FDMA | single carrier, frequency division multiple access |
| UE | user equipment, such as a mobile station, mobile node or mobile terminal |
| UL | uplink (UE towards eNB) |
| UTRAN | universal terrestrial radio access network |

The specification of a communication system known as evolved UTRAN (E-UTRAN, also referred to as UTRAN-LTE or as E-UTRA) has been a working project within the 3GPP. As specified the DL access technique is OFDMA, and the UL access technique is SC-FDMA.

One specification of interest is 3GPP TS 36.300, V8.11.0 (2009 September), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009 September).

FIG. 1A reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME by means of a S1 MME interface and to an S-GW by means of a S1 interface (MME/S-GW). The S1 interface supports a many-to-many relationship between MMEs/S-GWs and eNBs.

The eNB hosts the following functions:

functions for RRM: RRC, Radio Admission Control, Connection Mobility Control, Dynamic allocation of resources to UEs in both UL and DL (scheduling);

IP header compression and encryption of the user data stream;

selection of a MME at UE attachment;

routing of User Plane data towards the EPC (MME/S-GW);

scheduling and transmission of paging messages (originated from the MME);

scheduling and transmission of broadcast information (originated from the MME or O&M); and a measurement and measurement reporting configuration for mobility and scheduling.

Of particular interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009 December), 3rd Generation Partnership Project; Technical Specification Group Radio Access Network; Requirements for Further Advancements for EUTRA (LTE-Advanced) (Release 9). A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation (CA), where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows one non-limiting example of carrier aggregation, where M Rel-8 component carriers are combined together to form an MHRel-8 BW (e.g. 5 H 20 MHz=100 MHz, given M=5). Rel-8 terminals receive/transmit on one component carrier, whereas LTE-A terminals may receive/transmit on multiple component carriers simultaneously to achieve higher (wider) bandwidths.

Based on a latest agreement from RAN2#68bis it was decided that the UE can be configured with deactivated CCs. For a deactivated DL CC the UE does not receive the PDCCH or PDSCH, and no CQI-like measurements. For an activated DL CC the UE receives PDSCH and PDCCH, if present. Activation/deactivation per CC or in common may be used. CCs are activated by L1 or MAC. In addition, CCs are deactivated by MAC or implicitly.

Additionally it was agreed that measurements on an activated CC can be done without gaps, and Rel-8/Rel-9 events are to be generalized.

It has not yet been discussed in detail how the handling of the measurements will be achieved. One obvious way forward is to reuse existing E-UTRAN mobility measurements and reporting. Reference in this regard can be made to 3GPP TS 36.331 V9.1.0 (2009 December) Technical Specification 3rd Generation Partnership Project; Technical Specification Group Radio Access Network; Evolved Universal Terrestrial Radio Access (E-UTRA) Radio Resource Control (RRC); Protocol specification (Release 9), section 5.5.

It also has been acknowledged by RAN4 that if the UE supports carrier aggregation, which would allow it to simultaneously receive considered carriers, the UE hardware has the capability to perform mobility measurements without measurement gaps, even if the carrier is not active, (e.g., is only configured).

As is defined in 3GPP TS 36.331, section 5.5.1, "measurement gaps" are periods that the UE may use to perform measurements, i.e., no (UL, DL) transmissions are scheduled.

Further reference with regard to carrier aggregation can be made to 3GPP TSG-RAN WG2 #68bis, Tdoc-R2-100531, Valencia, Spain. 18-22 Jan. 2010, Source: NTT Docomo, Inc., Title: Carrier aggregation deployment scenarios.

E-UTRAN mobility measurements and functionality as described in the above-referenced 3GPP TS 36.331, and performance is described in 3GPP TS 36.133 V9.2.0 (2009 December) Technical Specification 3rd Generation Partnership Project; Technical Specification Group Radio Access Network; Evolved Universal Terrestrial Radio Access (E-UTRA); Requirements for support of radio resource management (Release 9).

UTRAN DC-HSDPA mobility is based on a primary carrier and for DC-HSUPA independent thresholds are assumed for each carrier.

SUMMARY

In an exemplary aspect of the invention, there is a method comprising receiving over a first component carrier from a serving cell at least one of a first threshold and a second threshold, and at least one of: measuring the first component carrier and determining if the measurement exceeds the first threshold, and utilizing the second threshold and determining if a neighboring cell is a potential candidate for scheduling on a second component carrier.

In another exemplary aspect of the invention, there is an apparatus, comprising at least one processor, and at least one memory including computer program code, where the at least one memory and the computer program code are configured, with the at least one processor, to cause the apparatus to receive over a first component carrier from a serving cell at least one of a first threshold and a second threshold, and at least one of: measure the first component carrier and determining if the measurement exceeds the first threshold, and utilize the second threshold and determine if a neighboring cell is a potential candidate for scheduling on a second component carrier.

In still another exemplary aspect of the invention there is an apparatus comprising means for receiving over a first component carrier from a serving cell at least one of a first threshold and a second threshold, and means for at least one of: measuring the first component carrier and determining if the measurement exceeds the first threshold, and utilizing the second threshold and determining if a neighboring cell is a potential candidate for scheduling on a second component carrier.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1A reproduces FIG. 4.1 of 3GPP TS 36.300, and shows the overall architecture of the EUTRAN system;

FIG. 1B shows an example of carrier aggregation as proposed for the LTE-A system;

FIG. 3B is based on scenario 2 of R2-100531 and shows co-located and overlaid cells with frequencies F1 and F2, where F1 has wider coverage than F2;

DETAILED DESCRIPTION

There are certain drawbacks to the use of existing mobility approaches. These drawbacks are addressed and solved by the exemplary embodiments of this invention. For example, one drawback relates to the signaling overhead, as there can potentially be a large number of event triggered measurement reports. Further, existing mobility measurements use measurement gaps. When the UE is configured for CA they will have to be active more or less continuously, thereby negatively impacting the throughput. Further still, there is a difference between cell search and measurements, and when an identified cell on a CC can be regarded as being sufficiently useful (quality wise) for scheduling its use in CA.

There is thus a need to ensure activation and deactivation in a different manner for use with CA, different than techniques currently available for mobility measurements, in order to ensure better throughput performance and improved UE power consumption performance.

Figure 2:
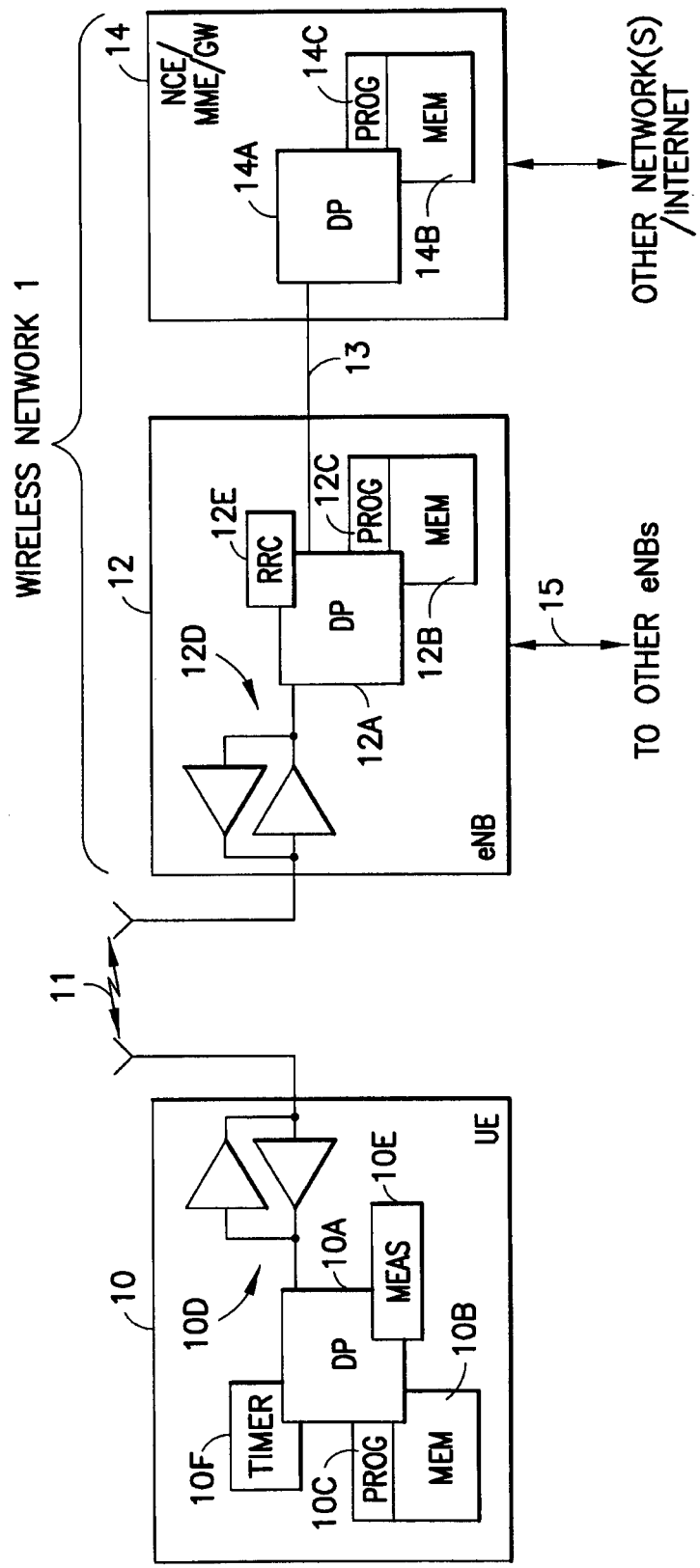
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include a measurement unit (MEAS) 10E that operates in accordance with the exemplary embodiments of this invention, and the eNB 12 includes a RRC function 12E for signaling various threshold or offset values and an identification of a component carrier(s) to the UE 10, as described below in reference to, for example, FIG. 4. The UE 10 can also include at least one timer 10F that is used as described below. The timer 10F can be implemented as a hardware timer, a software timer, or as a combination of hardware and software.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Further, it is noted that the terms threshold and offset may be used interchangeably in this description. These terms are non-limiting and thus a use of either of these terms in describing the invention would not change anything concerning the basics or behavior of the described operations regarding the invention, such as had the other term been used.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

The exemplary embodiments of this invention provide in one aspect thereof a set of thresholds configured to be especially related to carrier aggregation configuration. The thresholds are set with a reference, e.g., to a serving (or camped on) cell reception level such as, for example, RSRP, or RSRQ (or some combination of RSRP and RSRQ).

Reference with regard to RSRP and RSRQ can be made to sections 5.1.1 and 5.1.3, respectively, of 3GPP TS 36.214 V9.0.0 (2009 December) Technical Specification 3rd Generation Partnership Project; Technical Specification Group Radio Access Network; Evolved Universal Terrestrial Radio Access (E-UTRA); Physical layer—Measurements (Release 9).

A first new threshold in accordance with the exemplary embodiments can be referred to as "CA(-cell) Search Threshold(s)". The purpose of this new CA cell search threshold is to set a threshold level by the network 1 to be used by the UE 10 to indicate when the UE 10 should start a cell search on a given CC. That is, the CA-Search Threshold(s) provides a tool for the network 1 to instruct the UE 10 when it can expect to identify other cells on a certain CC. This is a different type of threshold than those used during normal operation in, for example, UTRA/E-UTRA. That is, in current practice when the current serving cell degrades the UE 10 begins looking for intra-/inter-frequency cells. Note that the s-Measure in 3GPP 36.331 is defined as a threshold that determines when UE can choose not to measure any other (intra-frequency) cells than the serving cell, and thus differs from the CA-Search Threshold(s). More specifically, Note 3 of 3GPP TS 36.331, section 5.5.3.1 defines the s-Measure as when the UE 10 is required to perform measurements. The UE 10 is however allowed to perform measurements also when the serving cell RSRP exceeds 's-Measure', e.g., to measure cells broadcasting a CSG identity following use of the autonomous search function as defined in 3GPP TS 36.304.

It is noted that network devices, such as the UE 10, may be capable of monitoring/measuring/using multiple CCs, and so two or more CCs can be simultaneously assigned as active for the UE. This enables the network greater scheduling flexibility by giving it the ability to allocate channels to the same UE on any of the one or more CCs assigned to the UE. The CCs For the case that multiple CCs are assigned and active for a UE, one of the assigned CCs will be the UE's primary CC and the other(s) will be secondary CC(s). The UE's secondary CC(s) is/are also sometimes termed an extension carrier. In addition, it is noted that different CCs can cover different cells in a network. For example, a CC, such as a primary CC, can cover or connect with a serving cell and a secondary CC(s) can cover or connect with a neighbor cell. In another example, a CC, such as a primary CC, can cover or connect with a serving cell on one component carrier and a secondary CC(s) can cover or connect with another serving cell on another component carrier. Both serving cells (e.g. called primary serving cell or Pcell and secondary serving cell or Scell) might have one or more neighbors.

In accordance with the exemplary embodiments of this invention a separate search threshold is used to trigger the UE 10 to search for cells in measured CCs in the case where the serving cell (or primary carrier cell, or special cell, or another specified cell) becomes better than the threshold. This is valid in the case of CA as the transmitter is assumed to be co-located on different CCs (and as the propagation properties are different in different bands, the coverage is different in different CCs).

Depending on the serving cell threshold, and the given CA-Search Threshold, the UE 10 begins to search for cells on one or more configured CCs. Similarly the UE 10 terminates the search for cells on the CC when the serving cell reception level (e.g., RSRP) falls below the given CA-Search Threshold.

It should be noted that the CA-Search Threshold can be a generic, general threshold or it can be CC specific. For example, it can be useful to use a CC-specific threshold in a case where the CC frequency differs such that the coverage area is sufficiently different to justify use of separate threshold levels.

Note that the threshold used for starting and stopping the CA cell search does not need to be the same. For example, some offset can exist between the start CA cell search threshold and the stop CA cell search threshold can exist to provide hysteresis and avoid threshold border problems. Furthermore, timer 10F can be used to determine for how long the UE 10 should search on the candidate CC for cells to avoid excessive UE power consumption.

Further with regard to the timer 10F operation, assume that the UE 10 is measuring RSRP/RSRQ from serving the cell (Blocks 4C and 4E in FIG. 4 as described below). After processing the Block 4E measurement the result indicates that the CA cell search threshold is exceeded (Block 4F). This triggers the CA cell search (Block 4G). If the UE 10 identifies a CA cell during the cell search it will be tracked (measured). Additionally the UE 10 will start a timer 10F (Block 4H) which is used for additional searches. This timer 10F can be used in different ways: e.g., it can be used to re-initiate CA cell searches in case where the serving cell RSRP is still above cell CA search threshold, but no CA cells have been identified (this ensures repeated cell searches with a given interval while still limiting the UE 10 processing/power consumption load). The same timer 10F can also be used for indicating how often the UE 10 shall perform the CA cell search, also for the case when another CA cell(s) has already been identified. The timer 10F can also be used for indicating termination of the CA cell search on a given CC if the serving cell RSRP/RSRQ goes below the CA cell search threshold for the given time duration. It can also be used to indicate the measurement interval on the CA cell. Thus, the timer 10F can be used in various ways at different times. Of course, a multiplicity of timers can be defined and used sequentially or simultaneously, depending on need.

A second new threshold in accordance with the exemplary embodiments can be referred to as "Potential CA for scheduling Threshold". This second threshold can be used together with the first CA-cell search Threshold(s), or it can be used as a stand-alone threshold, e.g., if the CA-cell search Threshold(s) is not used. The purpose of the second threshold is to enable the network 1 to indicate to the UE 10 when the UE 10 should regard an identified CA-cell as 'good enough' to be used as a potential CA-cell for scheduling, i.e., a threshold for indicating to the network 1 when an identified CA-cell becomes a potential candidate for scheduling in the CA scheme.

With specific regard to CC threshold versus mobility setting, when identified the cell needs to fulfill a certain level of quality before scheduling can be considered (also possibly due to certain UE 10 power restrictions). When the second threshold is reached the CC cell can be used for scheduling, and this is indicated to the eNB 12 in UL signaling.

It can be appreciated that these two new thresholds defined for use in the CA case can be employed in various ways. As one non-limiting example, the actual configuration of the threshold can be given together with any needed RRC-level signaling used for pre-loading the UE 10 with CC information (for UE 10 CC configuration/preconfiguration). The information (thresholds) may be given to the UE 10 in a similar manner as a currently used reporting configuration. These new thresholds can be realized using measurement reporting and without measurement reporting. One exemplary approach is that the CA-cell search Threshold trigger does not trigger a measurement report to the network 1, but instead is used only as a UE 10 internal trigger to initiate the cell search on the given CC.

However, exceeding (or dropping below) the second threshold (the Potential CA for scheduling Threshold) could potentially trigger a UE 10 measurement report to the network 1, although the measurement report is not necessarily needed under all circumstances. The exact behavior and signaling (if any) is thus variable, and can be made implementation specific. What is of significance is that the UE 10 regards the identified cell on some certain CC as being a potential candidate for scheduling (or no longer a potential candidate) when the threshold level specified for the Potential CA for scheduling Threshold is crossed.

Figure 3A:
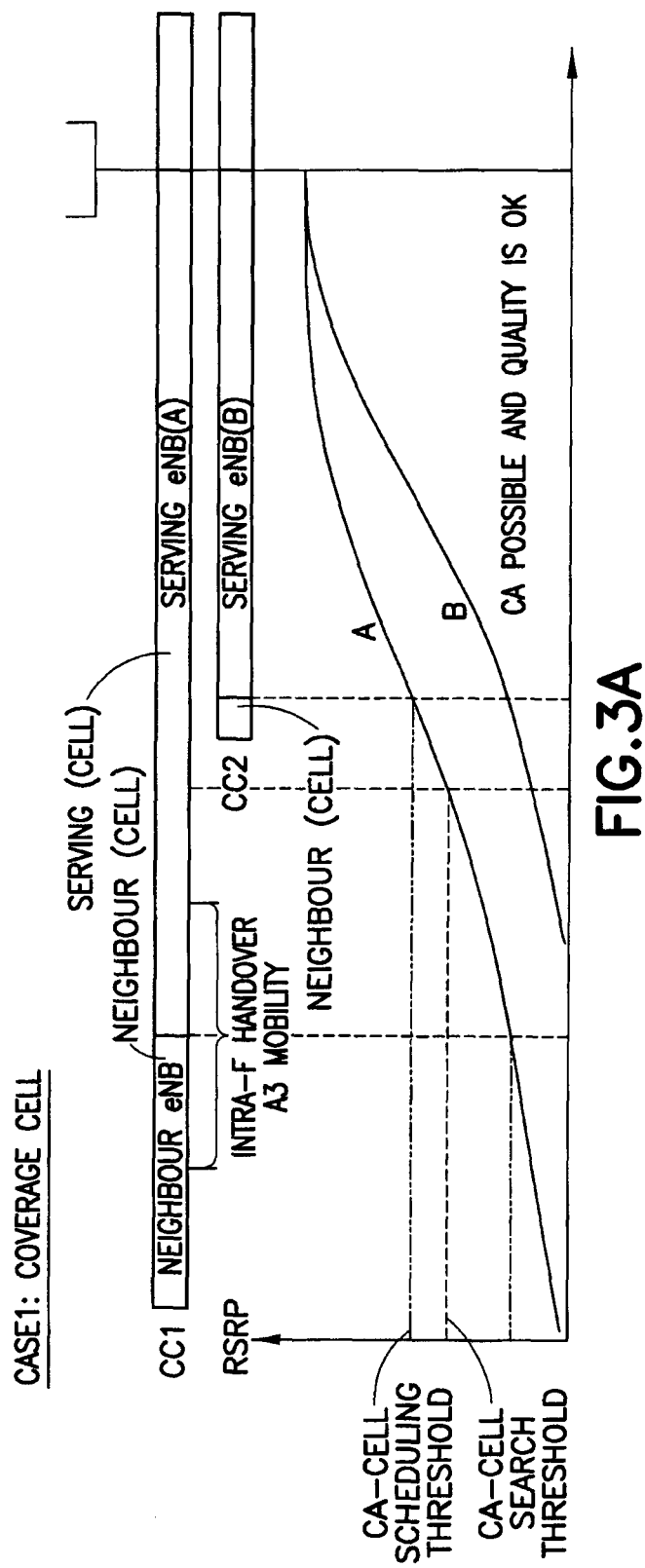
FIG. 3A illustrates one exemplary layout and setting of two thresholds (CA-cell scheduling threshold, CA-cell search threshold) in accordance with the exemplary embodiments of this invention.

FIG. 3A illustrates one exemplary layout and setting of thresholds in accordance with these exemplary embodiments. FIG. 3A plots the non-limiting case of RSRP versus time and shows two CCs (CC1 and CC2). FIG. 3A assumes a (non-limiting) similar scenario as in the scenario 2 of R2-100531. FIG. 3B is based on scenario 2 of R2-100531 and shows cells with frequencies F1 and F2. It is assumed that the F1 and F2 cells are co-located and overlaid, but F2 has smaller coverage due to larger path loss. In this scenario only F1 provides sufficient coverage and F2 is used to provide throughput. Mobility is performed based on F1 coverage. It is said in R2-100531 that this is a likely scenario when F1 and F2 are of different bands, e.g., F1={800 MHz, 2 GHz} and F2={3.5 GHz}, etc., and that it can be expected that aggregation is possible between overlaid F1 and F2 cells.

In FIG. 3A the upper trace A is associated with the serving eNB (A), while the lower trace B is associated with the serving eNB (B). Note in this example that the UE 10 is shown, by example, to first perform an intra-frequency handover on CC1 from the neighbor cell to the serving cell (serving eNB (A)).

Figure 4:
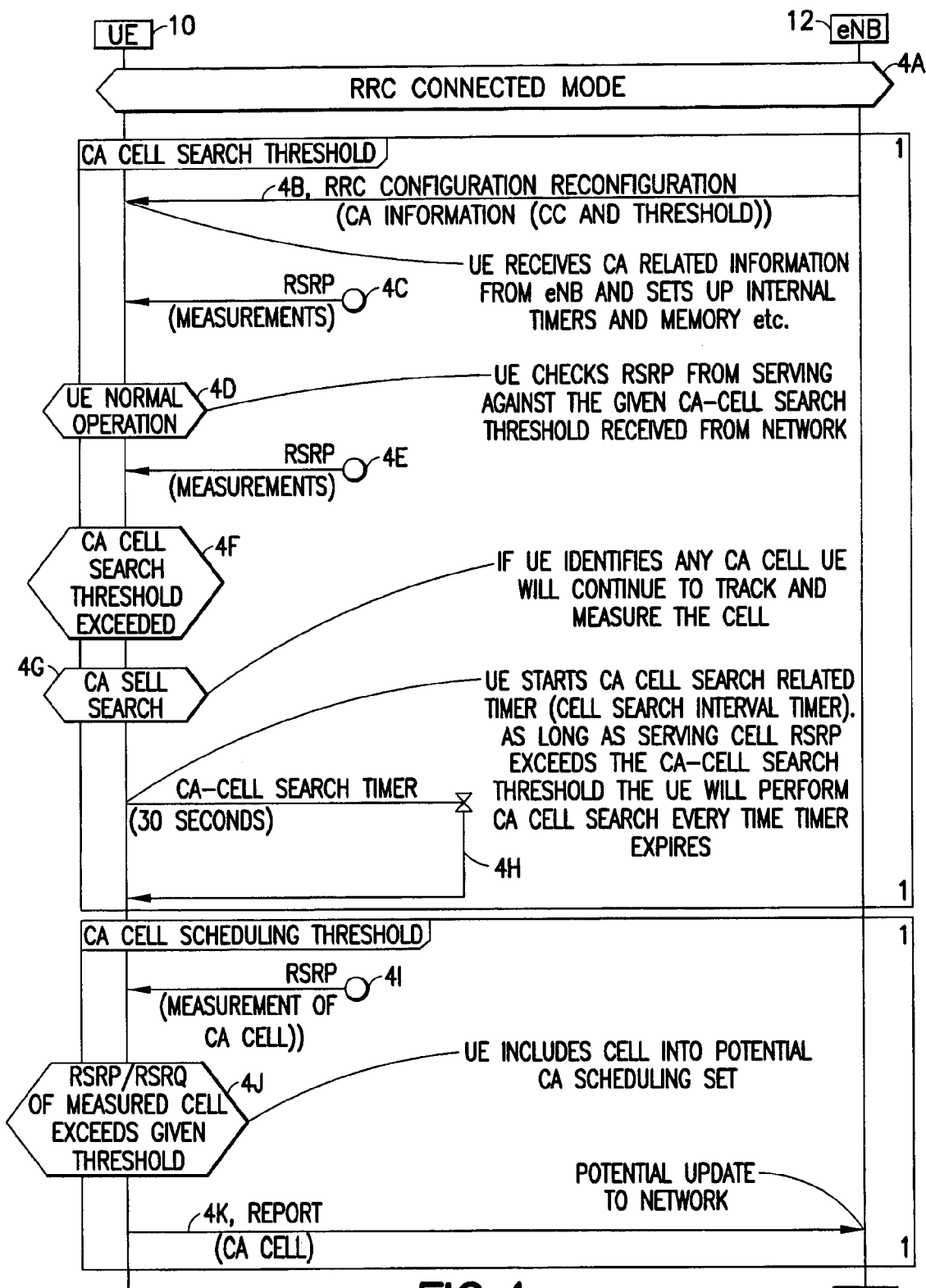
FIG. 4 is an exemplary message sequence chart showing one possible signaling flow.

FIG. 4 is an exemplary message sequence chart showing one possible signaling flow between the eNB 12 and the UE 10. Block 4A generally shows the RRC Connected Mode of the UE 10 and eNB 12. At 4B the eNB 12 signals an RRC Configuration/Reconfiguration event that includes CA information, an identification of a CC and the CA thresholds (or at least the CA-cell search threshold, the first threshold discussed above). In response, the UE 10 sets up internal timer(s) 10F, configures memory and performs any other necessary operations. 4C shows RSRP measurements. At 4D the UE 10 checks the RSRP from the serving cell (the active CC) against the previously signaled CA-cell search threshold. 4E shows additional RSRP measurements. At 4F the UE 10 finds that the measured RSRP has exceeded the CA-cell search threshold. At 4G the UE 10 performs a CA cell search, and if it identifies any CA cell the UE 10 continues to track and measure the CA cell. At 4H the UE 10 starts the CA cell search related timer 10F (cell search interval timer 10F, e.g. a 30 second timer). So long as the serving cell RSRP (the active CC) exceeds the CA-cell search threshold the UE 10 performs the CA cell search each time the timer 10F expires (e.g., every 30 seconds). It can be noted that in addition to the cell search, the UE 10 will perform measurements on potentially identified CA-cells.

Next is shown the use of the CA-cell scheduling threshold (the second threshold discussed above). At 4I the measurement of the CA cell is performed. If the RSRP/RSRQ of the measured CA cell exceeds the CA-cell scheduling threshold the UE 10 includes the CA cell into a potential CA scheduling set, and at 4K can report the identity of the CA cell (that CA cell whose RSRP/RSRQ exceeds the second, CA-cell scheduling threshold) to the eNB 12.

There are a number of technical effects and technical advantages that can be realized by the use of the exemplary embodiments of this invention. For example, there is provided an optimized search algorithm implementation in the UE 10, in combination with the potential to reduce UE 10 power consumption by separating the CA cell search from mobility performance requirements. The use of the exemplary embodiments of this invention also allows for separation of performance requirements between mobility and CA operations, and furthermore allows for cell search and measurements on CA cells to be performed in a 'continuous' manner without impacting mobility-related measurement gap measurements.

Based on the foregoing it should be apparent that the exemplary embodiments of this invention provide a method, apparatus and computer program(s) to enhance the operation of the UE 10 in a CA environment.

Figure 5:
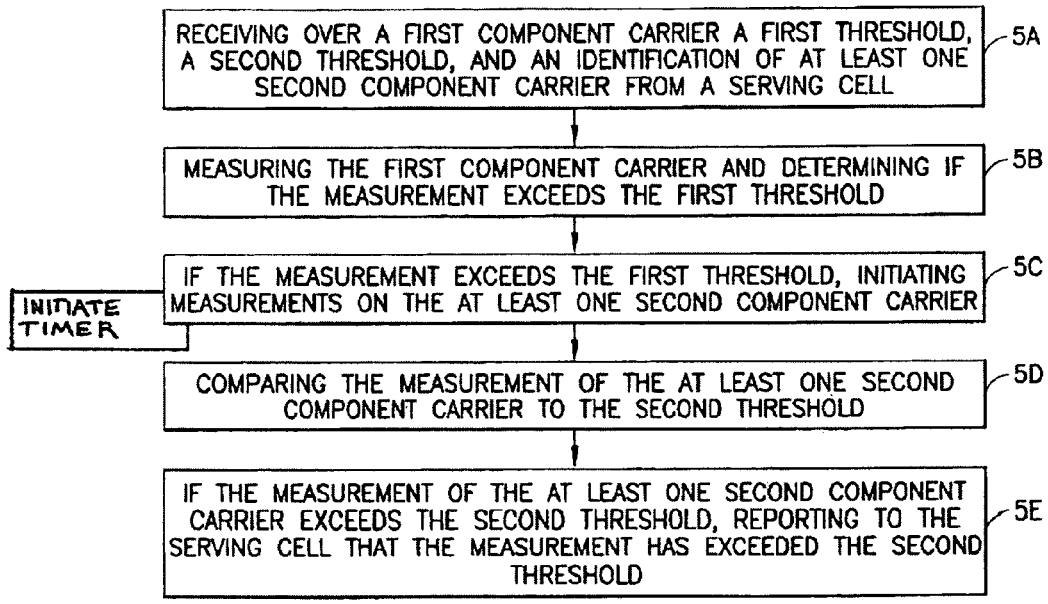
FIGS. 5, 6, 7, and 8 are each a logic flow diagram that illustrates the operation of a method, and a result of execution of computer program instructions embodied on a non-transitory computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of receiving over a first component carrier a first threshold, a second threshold, and an identification of at least one second component carrier from a serving cell. At Block 5B there is a step of measuring the first component carrier and determining if the measurement exceeds the first threshold. At Block 5C there is a step, if the measurement exceeds the first threshold, of initiating measurements on the at least one second component carrier. At Block 5D there is a step of comparing the measurement of the at least one second component carrier to the second threshold. At Block 5E there is a step, if the measurement of the at least one second component carrier exceeds the second threshold, of reporting to the serving cell that the measurement of the at least one second component carrier has exceeded the second threshold.

In accordance with the method shown in FIG. 5, further comprising terminating measurements of the at least one second component carrier if a measurement value does not exceed the first threshold.

In accordance with the method shown in FIG. 5, further comprising terminating measurements of the at least one second component carrier if a measurement value does not exceed the first threshold offset by some value.

In accordance with the method shown in FIG. 5, where when more than one component carrier is identified in the step of Block 5A each of the identified component carriers can have at least one threshold associated therewith, where the thresholds are same or are different.

In accordance with the method shown in FIG. 5, where initiating measurements comprises initiating cell search measurements and measurements related to RSRP/RSRQ activity.

In accordance with the method shown in FIG. 5, where the step of Block 5C includes initiating a timer, and where measuring the second component carrier occurs upon the expiration of the timer.

In accordance with the method shown in FIG. 5, where the step of Block 5C includes initiating a timer, and where measuring the second component carrier occurs until the expiration of the timer.

In accordance with the method as described in any one of the preceding paragraphs, where the steps of measuring measure at least one of reference signal received power and reference signal received quality.

In accordance with the method as described in any one of the preceding paragraphs, where the first threshold, the second threshold, and the identification of a second component carrier are received from the serving cell with radio resource control signaling.

In accordance with the method as described in any one of the preceding paragraphs, further comprising, after reporting, being scheduled to the second component carrier by the serving cell.

In accordance with the method as described in any one of the preceding paragraphs, executed by a user equipment configured for operation with component carrier aggregation.

Figure 6:
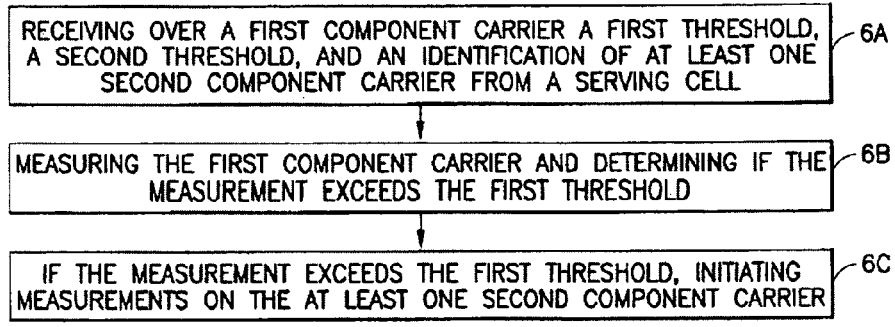

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of receiving over a first component carrier a first threshold and an identification of at least one second component carrier from a serving cell. At Block 6B there is a step of measuring the first component carrier and determining if the measurement exceeds the first threshold. At Block 6C there is a step, if the measurement exceeds the first threshold, of initiating measurements on the at least one second component carrier.

In accordance with the method shown in FIG. 6, following block 6C there is an optional step of comparing the measurement of the at least one second component carrier to a second threshold and, if the measurement of the at least one second component carrier exceeds the second threshold, reporting to the serving cell that the measurement of the at least one second component carrier has exceeded the second threshold.

Figure 7:
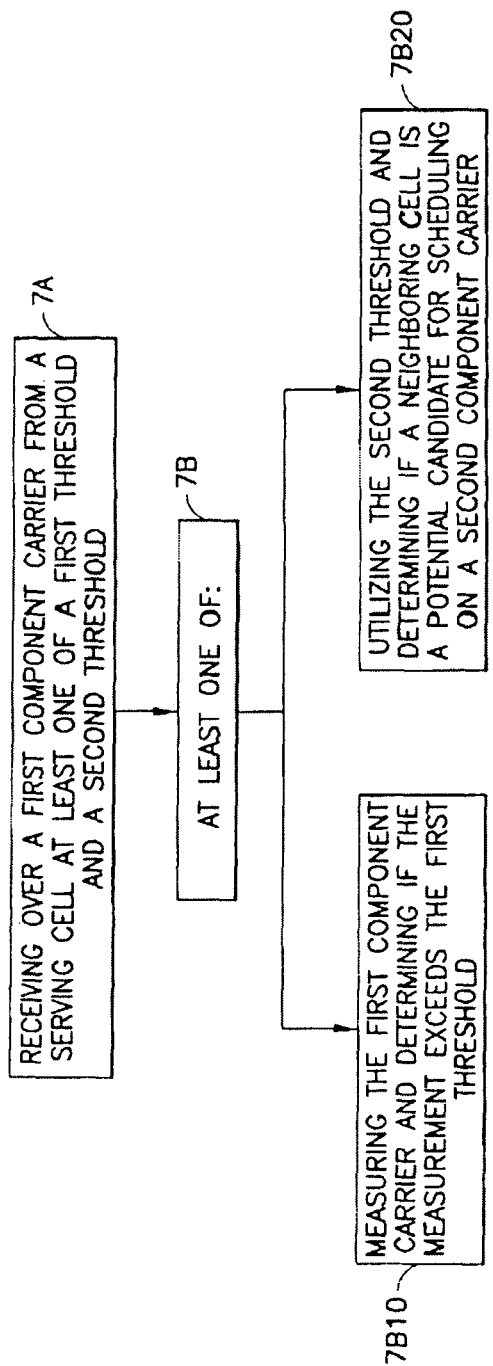

FIG. 7 is a logic flow diagram that illustrates the operation of a method, and a result of execution of computer program instructions, further in accordance with the exemplary embodiments of this invention. In accordance with these exemplary embodiments a method performs, at Block 7A, a step of receiving over a first component carrier from a serving cell at least one of a first threshold and a second threshold. At Block 7B there is optional step of, at least one of step 7B10: measuring the first component carrier and determining if the measurement exceeds the first threshold; and step 7B20: utilizing the second threshold and determining if a neighboring cell is a potential candidate for scheduling on a second component carrier.

In accordance with the method shown in FIG. 7, where measuring the first component carrier is for a case of receiving the first threshold, and where if the measuring of the first component carrier exceeds the first threshold then at least one of measuring a second component carrier and initiating a cell search on the second component carrier.

Further, in accordance with the preceding paragraph, there is initiating a timer, where the timer controls at least one of initiating the cell search on the second component carrier and providing an interval for the measuring on the second component carrier.

Further, in accordance with the preceding paragraph, if a measuring of the first component carrier does not exceed the first threshold then there is terminating the at least one of measuring the second component carrier and the initiating the cell search on the second component carrier.

In accordance with the preceding paragraphs, where the second threshold is used to identify a neighboring cell as a potential candidate for scheduling.

In accordance with a preceding paragraph, the utilizing and the determining is for a case of receiving the second threshold, and the receiving measuring and utilizing comprises measuring at least the neighboring cell and determining whether the measurements of the neighboring cell exceed the measurements of a serving cell of the second component carrier by an offset value.

Further, in accordance with the preceding paragraph, the case that the measurements of the neighboring cell exceeds the measurements of the at least one of the serving cell of the second component carrier by the offset value, sending a measurement report to the serving cell.

In accordance with a preceding paragraph, terminating measurements of at least the neighboring cell if the measurement of the neighboring cell does not exceed the first threshold by an offset value.

Further, in accordance with any of the preceding paragraphs, the measuring comprises initiating cell search measurements and measurements related to at least one of reference signal received power and reference signal received quality activity.

Figure 8:
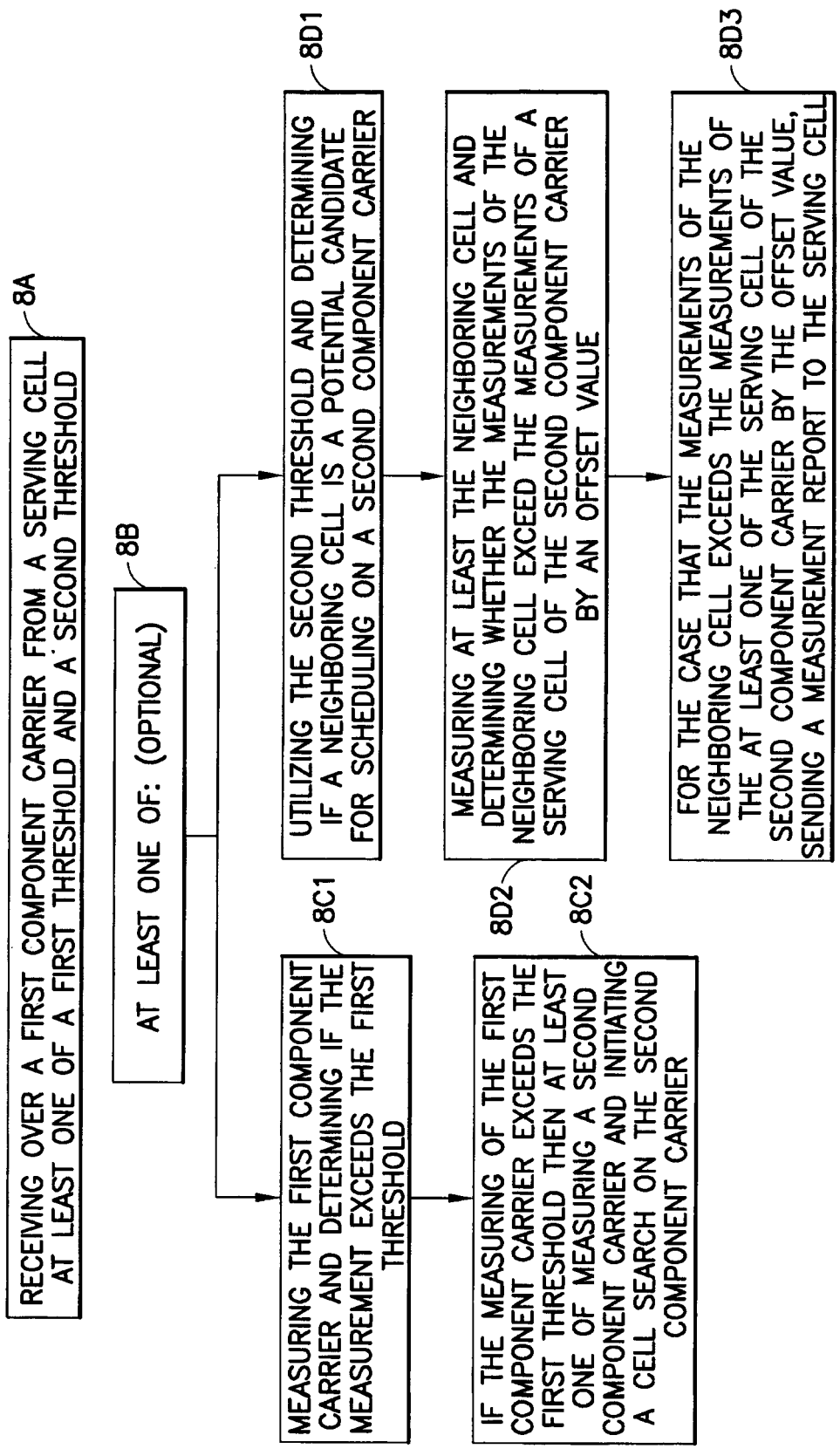

FIG. 8 is a logic flow diagram that illustrates the operation of a method, and a result of execution of computer program instructions, further in accordance with the exemplary embodiments of this invention. In accordance with these exemplary embodiments a method performs, at Block 8A, a step of receiving over a first component carrier from a serving cell at least one of a first threshold and a second threshold. At Block 8B there is a choice of at least one of these two optional blocks of steps of, at Block 8C1: a step measuring the first component carrier and determining if the measurement exceeds the first threshold, and at Block 8C2: a step of, if the measuring of the first component carrier exceeds the first threshold, then at least one of measuring a second component carrier and initiating a cell search on the second component carrier; AND/OR at Block 8D1: a step of utilizing the second threshold and determining if a neighboring cell is a potential candidate for scheduling on a second component carrier, and at Block 8D2: a step of measuring at least the neighboring cell and determining whether the measurements of the neighboring cell exceed the measurements of a serving cell of the second component carrier by an offset value, and at Block 8D3: a step of, for the case that the measurements of the neighboring cell exceeds the measurements of the at least one of the serving cell of the second component carrier by the offset value, sending a measurement report to the serving cell. Note the optional steps of Blocks 8C1-2 and/or 8D1-3 can be used independently following other operations in accordance with the embodiments of the invention.

The various blocks shown in FIGS. 5, 6, 7, and 8 may be viewed as method steps, and/or as operations that result from operation of computer program code, and/or as a plurality of coupled logic circuit elements constructed to carry out the associated function(s). Further, the various steps and operations recited in each of FIGS. 5, 6, 8, and 8 are applicable to each of these figures.

The exemplary embodiments of this invention also encompass an apparatus that comprises a processor and a memory that includes computer program code. The memory and computer program code are configured to, with the processor, cause the apparatus at least to perform receiving over a first component carrier from a serving cell a first threshold, a second threshold, and an identification of a second component carrier; measuring the first component carrier and determining if the measurement exceeds the first threshold; if the measurement exceeds the first threshold, initiating measurements on the second component carrier; comparing the measurement of the second component carrier to the second threshold; and if the measurement of the second component carrier exceeds the second threshold, reporting to the serving cell that the measurement of the second component carrier has exceeded the second threshold.

The exemplary embodiments of this invention also encompass an apparatus that comprises a processor and a memory that includes computer program code. The memory and computer program code are configured to, with the processor, cause the apparatus at least to perform sending to a user equipment over a first component carrier a first threshold related to user equipment measurements of the first component carrier, a second threshold related to user equipment measurements of at least one second component carrier and an identification of the at least one second component carrier; and receiving a report from the user equipment that the measurement of the second component carrier has exceeded the second threshold.

The exemplary embodiments of this invention also encompass an apparatus that comprises a processor and a memory that includes computer program code. The memory and computer program code are configured to, with the processor, cause the apparatus at least to perform: receiving over a first component carrier from a serving cell at least one of a first threshold and a second threshold, and at least one of step measuring the first component carrier and determining if the measurement exceeds the first threshold and utilizing the second threshold and determining if a neighboring cell is a potential candidate for scheduling on a second component carrier.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-A system, it should be appreciated that the exemplary embodiments of this invention are not limited for use with only this one particular type of wireless communication system, and that they may be used to advantage in other wireless communication systems that use multiple component carriers and some form of carrier aggregation.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., RSRP, RSRQ, etc.) are not intended to be limiting in any respect, as these parameters may be identified by any suitable names. Further, the various names assigned to different thresholds are not intended to be limiting in any respect, as these various thresholds may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method comprising:
receiving over a first component carrier from a serving cell a first threshold and a second threshold; and
measuring the first component carrier and determining if the measurement exceeds the first threshold; and upon determining that the measurement exceeds the first threshold then
utilizing the second threshold and determining if a neighboring cell is a potential candidate for scheduling on a second component carrier.

2. The method of claim 1, where measuring the first component carrier is for a case of receiving the first threshold over the first component carrier, and where if a result of the measuring of the first component carrier exceeds the first threshold then at least one of measuring a second component carrier and initiating a cell search on the second component carrier.

3. The method of claim 2, further comprising initiating a timer, where the tinier controls at least one of initiating the cell search on the second component carrier and providing an interval for the measuring on the second component carrier.

4. The method of claim 2, where if the result of the measuring of the first component carrier does not exceed the first threshold then terminating-measuring the second component carrier and terminating the initiating of the cell search on the second component carrier.

5. The method of claim 1, where the utilizing and the determining, comprises:
measuring at least the neighboring cell; and
determining whether the measurements of the neighboring cell exceed the measurements of a serving cell of the second component carrier by an offset value.

6. The method of claim 5, where for the case that the measurements of the neighboring cell exceeds the measurements of the at least one of the serving cell of the second component carrier by the offset value, sending a measurement report to the serving cell.

7. The method of claim 5, further comprising terminating measurements of at least the neighboring cell if the measurement of the neighboring cell does not exceed the first threshold by an offset value.

8. The method as in claim 1, where measuring comprises initiating cell search measurements and measurements related to at least one of reference signal received power and reference signal received quality activity.

9. A non-transitory computer-readable medium that contains software program instructions, wherein execution of the software program instructions by at least one data processor results in performance of operations that comprise execution of the method according to claim 1.

10. An apparatus, comprising:
at least one processor; and
at least one memory including computer program code, where the at least one memory and the computer program code are configured, with the at least one processor, to cause the apparatus to at least:
receive over a first component carrier from a serving cell a first threshold and a second threshold; and
measure the first component carrier and determine if the measurement exceeds the first threshold; and upon determining that the measurement exceeds the first threshold then
utilize the second threshold and determine if a neighboring cell is a potential candidate for scheduling on a second component carrier.

11. The apparatus of claim 10, where measuring the first component carrier is for a case of receiving the first threshold over the first component carrier, and where if a result of the measuring of the first component carrier exceeds the first threshold then at least one of measuring a second component carrier and initiating a cell search on the second component carrier.

12. The apparatus of claim 11, further comprising initiating a timer, where the timer controls at least one of initiating the cell search on the second component carrier and providing an interval for the measuring on the second component carrier.

13. The apparatus of claim 11, where the at least one memory including the computer program code is configured, with the at least one processor, if the result of the measuring of the first component carrier does not exceed the first threshold, to cause the apparatus to terminate measuring the second component carrier and terminate initiating the cell search on the second component carrier.

14. The apparatus of claim 10, where the utilizing and the determining are for a case of receiving the second threshold, and where the utilizing and the determining comprises the at least one memory including the computer program code is configured, with the at least one processor, to cause the apparatus to:
  measure at least the neighboring cell; and
  determine whether the measurements of the neighboring cell exceed the measurements of a serving cell of the second component carrier by an offset value.

15. The apparatus of claim 14, where the at least one memory including the computer program code is configured, with the at least one processor, for the case that the measurements of the neighboring cell exceed the measurements of the serving cell of the second component carrier by the offset value, to cause the apparatus to send a measurement report to the serving cell.

16. The apparatus of claim 14, further comprising the at least one memory including the computer program code is configured, with the at least one processor to cause the apparatus to terminate measurements of the neighboring cell if the measurements of the neighboring cell do not exceed the first threshold by an offset value.

17. The apparatus as in claim 10, where measuring comprises initiating cell search measurements and measurements related to at least one of reference signal received power and reference signal received quality activity.

18. The apparatus as in claim 10, the apparatus is disposed within a mobile platform.

19. An apparatus, comprising:
  means for receiving over a first component carrier from a serving cell a first threshold and a second threshold; and
  means for measuring the first component carrier and determining if the measurement exceeds the first threshold; and upon determining that the measurement exceeds the first threshold then
  utilizing the second threshold and determining if a neighboring cell is a potential candidate for scheduling on a second component carrier.

20. The apparatus of claim 19, where the means for receiving comprises a receiver, and where the means for measuring, utilizing, and determining comprises at least one computer-readable memory storing at least one program of computer instructions executable by at least one data processor.

* * * * *

UNITED STATES PATENT AND TRADEMARK OFFICE
CERTIFICATE OF CORRECTION

| | | |
|---|---|---|
| PATENT NO. | : 9,107,227 B2 | Page 1 of 1 |
| APPLICATION NO. | : 13/577759 | |
| DATED | : August 11, 2015 | |
| INVENTOR(S) | : Lars Dalsgaard et al. | |

It is certified that error appears in the above-identified patent and that said Letters Patent is hereby corrected as shown below:

In Claim 3:
Column 14, line 15, "tinier" should be deleted and --timer-- should be inserted.

Signed and Sealed this
Twenty-second Day of December, 2015

Michelle K. Lee
*Director of the United States Patent and Trademark Office*